United States Patent
Gold et al.

(10) Patent No.: US 6,811,080 B1
(45) Date of Patent: Nov. 2, 2004

(54) INTELLIGENT MEDIA READER AND LABEL PRINTER

(75) Inventors: Stephen Gold, Bristol (GB); Ian Peter Crighton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/937,020

(22) PCT Filed: Feb. 25, 2000

(86) PCT No.: PCT/GB00/00679

§ 371 (c)(1),
(2), (4) Date: Sep. 20, 2001

(87) PCT Pub. No.: WO00/57354

PCT Pub. Date: Sep. 28, 2000

(30) Foreign Application Priority Data

Mar. 24, 1999 (EP) ............................ 99302266

(51) Int. Cl.[7] .............................................. G06K 15/00
(52) U.S. Cl. ...................................... 235/383; 235/385
(58) Field of Search ................................ 235/383, 385, 235/375, 462.01, 462.14

(56) References Cited

U.S. PATENT DOCUMENTS

| | | | | |
|---|---|---|---|---|
| 3,990,710 A | * | 11/1976 | Hughes | 369/34.01 |
| 4,141,045 A | | 2/1979 | Sheehan | 360/15 |
| 5,121,687 A | | 6/1992 | Arcotta | |
| 5,455,409 A | | 10/1995 | Smith et al. | |
| 5,503,483 A | | 4/1996 | Petteruti et al. | 400/88 |
| 5,518,325 A | * | 5/1996 | Kahle | 400/70 |
| 5,581,522 A | * | 12/1996 | Sibuya et al. | 235/462.01 |
| 5,592,596 A | | 1/1997 | Balsom | |
| 5,640,002 A | | 6/1997 | Ruppert et al. | 235/472 |
| 5,679,943 A | | 10/1997 | Schultz et al. | 235/472 |
| 5,765,954 A | | 6/1998 | Nunokawa et al. | 400/208 |
| 5,809,003 A | * | 9/1998 | Taira et al. | 369/275.1 |
| 6,027,019 A | * | 2/2000 | Kou | 235/375 |
| 6,138,909 A | * | 10/2000 | Rockwell et al. | 235/383 |
| 6,182,565 B1 | * | 2/2001 | Takayama et al. | 101/35 |
| 6,311,896 B1 | | 11/2001 | Mulla et al. | 235/472.03 |
| 6,505,981 B1 | | 1/2003 | Takami et al. | 400/602 |

* cited by examiner

Primary Examiner—Daniel St.Cyr
(74) Attorney, Agent, or Firm—Lowe Hauptman Gilman & Berner, LLP (57) ABSTRACT

A library system having a reader and labeling device (200) for interrogating data storage cartridges of the type containing an in-built memory chip having information stored describing details of data contained on the data storage medium is disclosed. The reader-labeling device comprises a processor, random access memory, printer, display, keypad, operating system, transponder, receiver and battery power supply. Key parameters describing a data cartridge can be accessed quickly and efficiently without the need to access the data storage medium itself. A cartridge media specific label may be rapidly printed for attachment to a data storage cartridge. The reader-labeling device may be incorporated into an automatic library (201) accessible by a robotic arm (202), wherein the user may quickly read summary information describing a data storage cartridge or its contents from information stored on a memory attached to the cartridge by use of the reader-labeling device externally controlled.

13 Claims, 8 Drawing Sheets

Serial No: 2851035268    1st file: C:/Records.Backup.0108B1

Date Last Used:   05 Sep 97    Last file: C:/Records.Backup.0408B1

Space Remaining: 445MB

INTELLIGENT MEDIA READER AND LABEL PRINTER

FIELD OF THE INVENTION

The present invention relates to labelling of recording medium cartridges of the type which include a memory device for storing information concerning the cartridge and data recorded on the recorded medium, and particularly although not exclusively it relates to the manner of reading this information and using it to produce a printed label containing all of, or a selected subset of this information.

BACKGROUND TO THE INVENTION

In order to store digital electronic data, such as back-up data from a server computer device, it is known to use magnetic tape data storage cartridges comprising one or a pair of rotatable reels, and an elongate band of magnetic tape. A main reason for using such tape data storage cartridges is to make back up copies of important data. Customers running large computer installations, or research and development facilities having significant amounts of data generated may have hundreds or thousands of tape data storage cartridges containing back up data, backed up from a wide range of different host devices such as servers and computer devices. Large collections of tape data storage cartridges tend to be stored in centralised library locations, sometimes situated in fire proof safes or fire proof rooms. The library storage facility may be geographically remote from the host server devices, so that if there is destruction of data on the host devices, for example by a fire, the back up data remains safe. When a host device fails and data is lost, it is necessary to quickly locate the tape cartridge having the latest back up data, which may be located in an offsite library.

These libraries include manual access libraries, where the cartridges are simply stored on shelves or in racks or boxes, with access to the cartridges being by manually picking up the cartridges, or automated libraries, where the cartridges are stored in predefined locations on a rack or shelf and are automatically accessed. In a manual access library, to identify a content of a tape cartridge a person may simply write out a label manually, describing the content of the data on the tape cartridge. This process is tedious and prone to error. For example the wrong label might be put on the wrong tape, so that the contents of the label do not coincide with the data of the tape cartridge. Alternatively, tape cartridges have barcodes printed on their external cases, so conventionally finding a particular tape may involve using a barcode scanner to scan a plurality of barcode labels on a plurality of tape cartridges. In the case of an automated library, robotic arms which are software controlled, deposit and collect cartridges in a rack, or shelf, and use a serial number of a tape data storage cartridge to determine a location within the library shelf or rack on which to store the cartridge. The rack or shelf is accessible by the robotic arm which may physically select a required tape on receipt of user instructions, the robotic arm being moved under computer control to a cartridge storage location on the rack or shelf.

Conventionally, a person wishing to find an item of stored data on a cartridge will need firstly to identify the correct cartridge with the data on it, and secondly identify a position of the data on the tape stored within the cartridge. In the case of single reel cartridges, the whole of the magnetic tape is wound on to the single cartridge whenever the cartridge is not in a tape drive mechanism. To find a particular item of data on a cartridge, a person must select the cartridge, put the cartridge into a conventional tape drive device, for example forming part of a host personal computer, workstation or computerised test equipment device, and view a content of the tape on a visual display unit forming part of the host computer, workstation or test equipment device. There is a time lag incurred in winding and rewinding the tape to identify a particular item of data.

A current industry trend in tape data storage media is to supply a solid state transponder memory data storage device on or within a tape cartridge, on which can be stored information describing a data content of the tape. Examples of the type of information stored include file name and type, customer information, system data backed-up, application and file space on the magnetic tape used or remaining. The information stored on such a memory device is upgraded when the magnetic tape is accessed using a known tape drive in a host computer having an integrated driver and read-write device, controlled by software resident on the host device. Many different types of tape data storage cartridge are used in system backup and the location of the transponder memory storage device in relation to a casing of the tape cartridge varies between cartridge media types and is specific to the particular cartridge media type in each case.

To identify items of data stored on the tape cartridge, the memory device comprising part of the cartridge stores data as mentioned above, describing the file names, customer information, application and file space remaining on the tape or used on the tape, and dates of storage of files. A summary information describing the data items stored on the tape can be obtained by automatically interrogating the transponder memory storage device in the cartridge, which is read by the tape drive device by inductive coupling to a transceiver chip forming part of the memory device, and which can be displayed on the visual display unit of the host device. Reading the content of the memory device involves physically picking up the data cartridge, putting the data cartridge in the tape drive of the host device, operating a keypad or pointing device, for example a mouse or tracker ball, to select menu items from an application program on the host device, in order to identify the information describing the data content of the tape.

In order to print a label for the tape, this involves running an application stored on the host device, perhaps manually entering the information describing the data on the tape via a keyboard and/or pointing device and then printing out the label. A problem in printing a label for the tape cartridge by this mechanism is the time taken to print each label. For example, for a person wishing to find a particular item of data in a library, the first time a person enters the library on a particular day, he may have to pick an unlabeled tape cartridge which the person thinks the data item may reside on, and in order to check the data on the cartridge needs to turn on the host computer device, wait for the host device to boot up and initialise, taking possibly a minute or two, select the application required for reading the memory device on the cartridge, again perhaps taking of the order of one or two minutes, and then read the data. If the data cartridge does not contain the required data, then the person needs to remove the cartridge from the drive, which may or may not involve a delay in the software controlling the tape drive unit allowing the person to remove the tape, and then select a different tape from the shelf. For the second, subsequent tape cartridge inspected, the time delays will be shorter than inspecting the first data cartridge, since the host device does not need to be booted up and initialised. However, there is still a significant delay in interrogating the memory device on the cartridge through the application software provided by the host device.

Having found the data cartridge containing the required data, in order to print a label for attachment to the cartridge, the person needs to call up the application software for printing the label, perhaps enter details describing the cartridge manually into the printing application software, using a keyboard and/or pointing device and before printing make sure that an attached printer device is turned on. In order to turn the printing device on, the printing device may go through a print initialisation routine, which in the case of an inkjet printer may take several minutes if used for the first time on a particular day, and providing there is sufficient print medium in the printer device, then a label can be printed. However, since many printer devices use paper as a print medium, it may be necessary to find and insert sheets of adhesive labels into the printer in order to print out an adhesive label for the tape cartridge.

Therefore, conventionally it may take anything of the order of 10 to 15 minutes to print a label for a data cartridge, including all the time delays involved in booting up a host device and initialising a printer. Additionally, this assumes that a host computer device is available at the location of the library, which it may not be, in which case an additional delay is incurred in taking the tapes to the host device for the data to be reloaded. Although the time delay taken to print a label for subsequent tape cartridges after the first will reduce per cartridge, the cataloguing and identification of data stored on existing legacy libraries of tape data storage cartridges is a time consuming process, whether the library is a manual access library, or an automated library having a robotic device for selected cartridges.

In all cases, in order to improve ease and accuracy of access to the us required data, a system for checking the data stored on a tape and labeling the tape accurately will be of benefit.

SUMMARY OF THE INVENTION

Specific embodiments and methods according to the present invention aim to improve the speed and accuracy of access of data contained on a plurality of data storage cartridges in a library of such cartridges.

The specific embodiments and methods disclosed herein aim to provide improved protection against loss of data by providing a rapid and accurate means of locating backed-up data required to restore lost data to a system.

Specific methods according to the present invention, recognise that information contained on transponder memory devices in a data storage cartridge can be used to provide a rapid means of access to a data set which can be utilised to identify the cartridge and to produce a cartridge label.

Conceptually, the specific embodiments of the invention aim to provide an integrated printer with built-in radio frequency capability to read information stored on a memory device integrated into a data storage medium cartridge casing which automatically prints the information read from the memory device in a preformatted user-readable form on a label suited to the specific cartridge casing type.

According to first aspect of the present invention there is provided an automatic library device for storing a plurality of cartridge type data storage devices each having a casing containing a high capacity data storage medium, and having a programmable memory device attached to said casing, said programmable memory device storing data describing said data storage device, said library device comprising:

a rack storage means having a plurality of receptacles for storing said plurality of said data storage devices;

an automatic selection means operable to select, retrieve and replace said data storage devices from said rack; and a reader device capable of reading a data content stored on a said programmable memory device, wherein said selection means is configured to present a said data storage medium to said reader device, said reader device being configured to read data signals from said programmable memory device, of said data storage device, and print said read data onto a print medium.

Preferably said reader device comprises a port configured to accept said cartridge type data storage device, and a printer device located in said port, said printer configured to print directly to a said data storage device when said data storage device is inserted in said port.

Said reader device may comprise:

a receiver means capable of receiving data signals from a said programmable memory of a said data storage device; and an interface means, arranged for interfacing with said processor for communicating said data signals to an external processor device.

Said reader device may comprise:

an interface means, arranged for interfacing with said processor for communicating said data signals to an external processor device, such that inspection of information contained in data read from said programmable memory device of said data storage device can be accessed on said external processor device via said interface.

The library device may further comprise:

a read only memory means storing an operating system or operating said processor to display said data items received from said received means; and a display device arranged to display said data items read from said programmable memory device.

The library device may comprise a means for emitting a power signal to said data storage device, said power signal emitting means located in close proximity to said cartridge port, for supply of power to said programmable memory device.

According to a second aspect of the present invention there is provided a method of labeling a data storage device with information stored on a programmable memory device positioned externally on a casing of said data storage device, said method comprising the steps of:

placing said data storage device in a port of a reader device capable of reading data signals describing a data content stored on said programmable memory of said data storage device;

polling a detector device located in said port of said reader device for detecting said signals;

receiving said data signals describing a predetermined stored set of parameters concerning said data storage device;

storing said data signals in a memory device of said reader device; and printing said predetermined set of data items on an area having a size and shape which fits on said data storage device.

Said step of printing said predetermined set of data items may comprise printing said predetermined set of data items on a label of a size and shape suitable for direct attachment to said data storage device.

Said step of printing may comprise printing said data items directly onto a cartridge of said data storage device.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST M D FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be praised without limitation to these specific details. In other instances, well known methods and structures have not been described in detail so as not to unnecessarily obscure the present invention.

In order to remove errors in cartridge labeling and to improve the speed of labeling, a media-dependent labeling system is envisaged which is specific to a particular type or design of data storage media device. This uses information contained on a memory device located in the data storage cartridge (the media) to produce a printed cartridge label, where the label attributes can be selected by or the user. This system enables cartridge data to be assessed and the cartridge to be labelled without having to access the data stored on the magnetic tape and hence avoiding the use of a tape driver of a host device. As a result, the information concerning data contained in the cartridge can be assessed rapidly. By integrating a means of reading the information contained on the cartridge memory device with a means of printing this information either directly to a pre-labelled cartridge or to a blank label all within one device, cartridge labels may be updated accurately and rapidly.

Labeling of a data storage device need not occur at a time when data is recorded on the data storage medium, but labeling can occur retrospectively, and away from a host device having a tape drive mechanism.

Additionally, the device may support multiple language sets and fonts for versatility in user readout. This will allow for versatility and accuracy in user access to cartridge data.

Specific methods according to the present invention described herein are concerned with the reading of data from solid state memory devices located on data storage devices and writing this data to a memory area and the selection of data from this memory area for display and printing.

Figure 1:
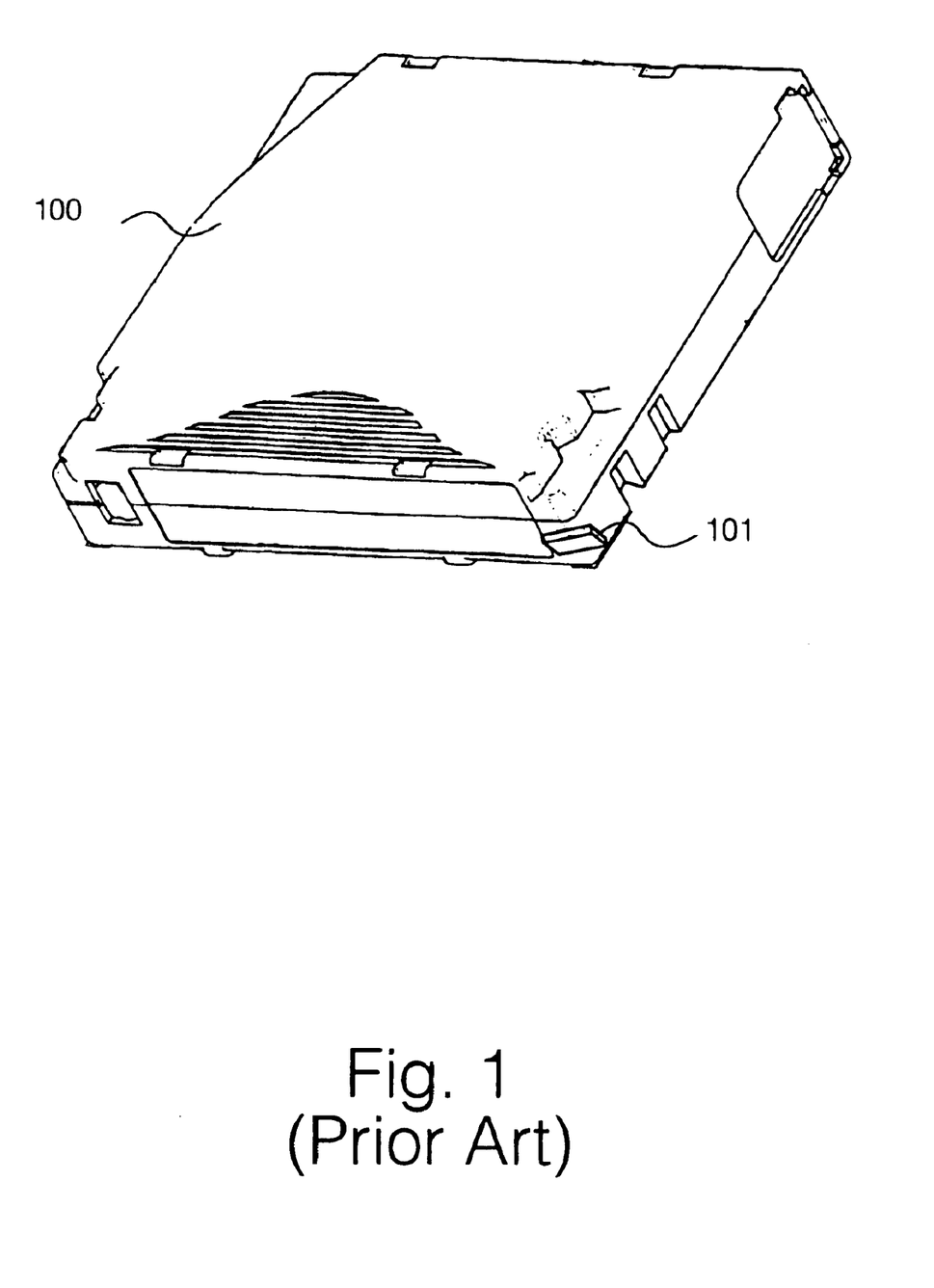
FIG. 1 is a perspective view of a tape data storage cartridge having an embedded read/write memory accessible by means of a transponder unit within the cartridge, as is known in the prior art.

In one embodiment, a media reader and printer device may be incorporated into a standard 5.25 inch device slot Referring to FIG. 1 herein, there is illustrated schematically a conventional prior art tape data storage cartridge device comprising a cartridge casing 100, containing one or a pair of reels on which is wound an elongate band of magnetic tape, comprising a high capacity data storage medium on which data may be recorded from a host device such as a computer server device, a personal computer, a workstation, or a computer controlled test instrument. The cartridge contains a solid state programmable memory device 101 within the cartridge casing 100, the memory device comprising a transponder unit, and a read/write memory, which can be written to or read via the transponder unit, which can be inductively powered by an RF signal generated by a transmitter placed immediately adjacent the cartridge casing, as is known in the art. The height, width, and length dimensions of the cartridge casing 100 and the general layout of the casing, including the positioning of the memory device 101 within the casing, are specific to the particular type and design of tape data storage cartridge. That is to say the layout of the cartridge is media specific.

Information about the cartridge and the data stored on the cartridge can be stored in the memory device 101. The data stored may include data describing file names of data on the tape, data describing customer information, data describing an application stored on the tape, data describing an amount of unused memory space remaining on the tape, and dates upon which files were stored.

Figure 2:
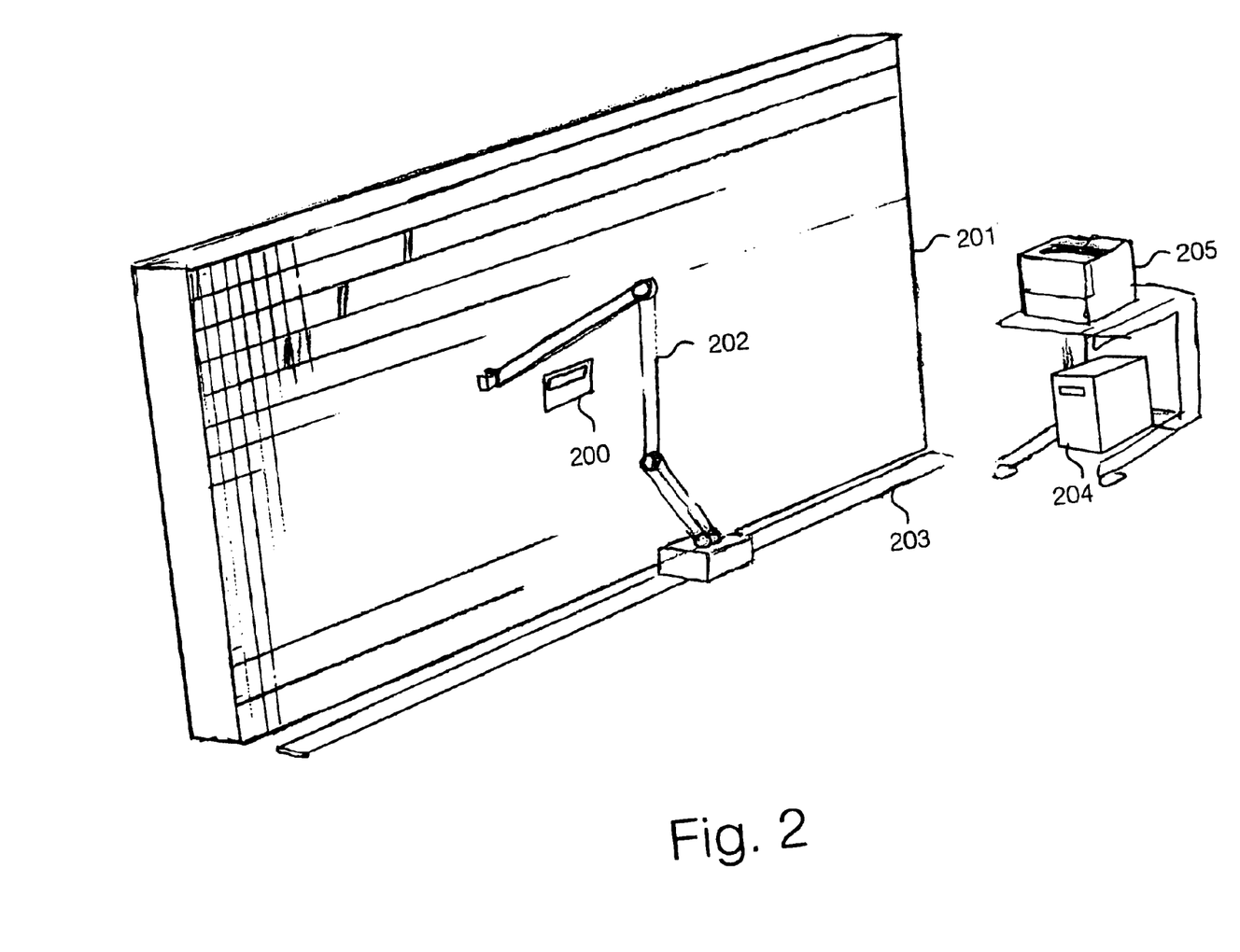
FIG. 2 is a partially schematic and partially perspective view of an installation of a second data storage media reader and labeling device in an automated data storage medium library having a rack and shelf arrangement accessible by a computer controlled robotic arm, according to a specific embodiment of the present invention.

Referring to FIG. 2 herein there is illustrated schematically a specific embodiment of cartridge reader and labeling device 200 installed in situ in an automated data storage cartridge library comprising a shelf or rack 201, having a plurality of locations for storing a plurality of tape data storage cartridges; an automatic robotic arm 202 operable to select and access individual tape data storage cartridges, the robotic arm 202 travelling along a substantially linear track 203, the arm capable of moving in vertical and first and second lateral directions and being capable of removing tape cartridges from their location, physically transporting them to reader and labeling device 200, inserting and extracting the cartridges from the reader and labeling device 200 and returning them to their storage locations. The second reader and labelling device interfaces with an external computer 204 having a processor, and/or an external printer 205.

Figure 3:
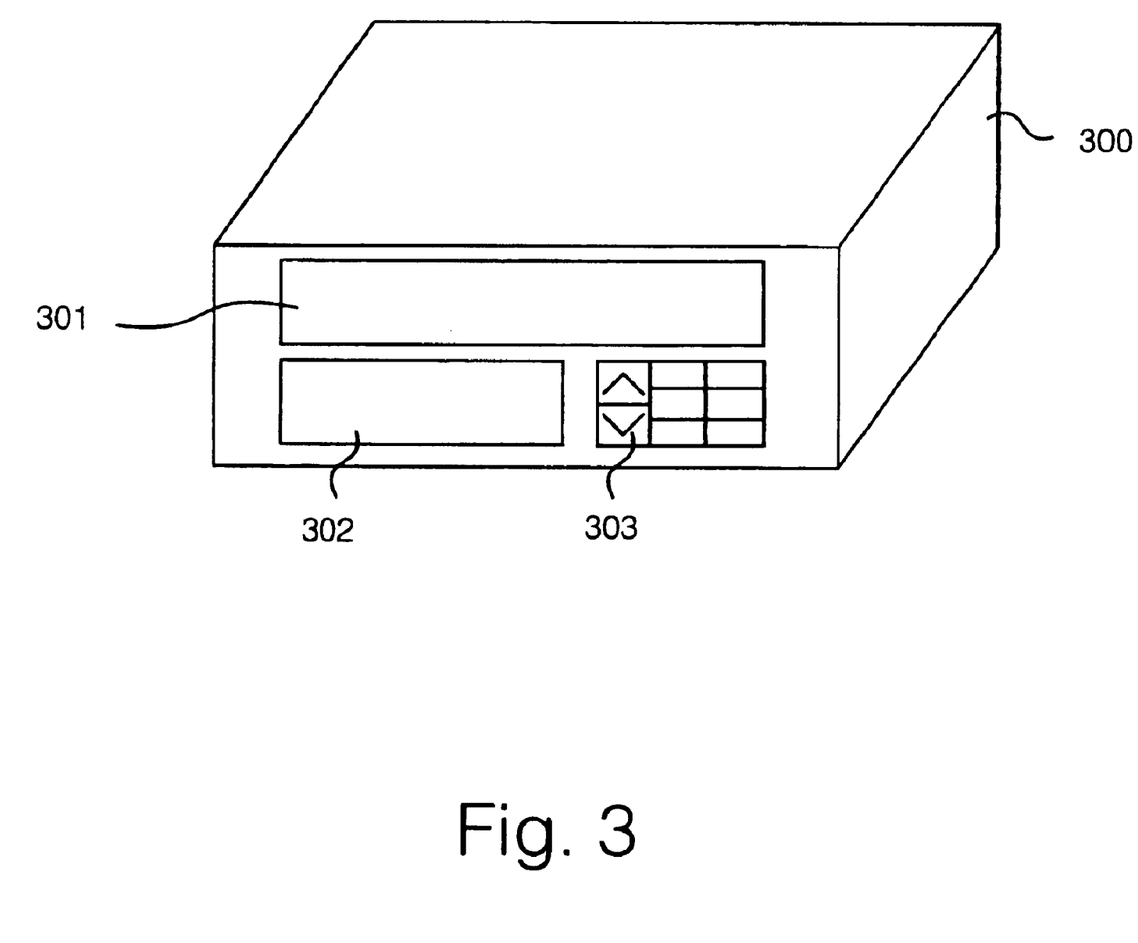
FIG. 3 is a perspective view of the reader and labeling device illustrated in FIG. 2.

Referring to FIG. 3 herein, there is illustrated schematically in greater detail the reader-labelling device 200. The reader-labelling device comprises a casing 300 suitable for fitting into, a 5.25 inch standard computer casing port, having power supply terminals and interface terminals at a rear of the casing (interface terminal not shown), the interface terminal comprising a standard computer peripheral port, on a front face of the casing 300 there being provided a cartridge port 301 for accepting a tape data storage cartridge, in a manner such that the tape data storage cartridge when inserted into the port may have a remaining portion projecting and extending out of the port, allowing the robotic arm to grasp the cartridge for insertion and removal from the port; optionally, a display device 302, and a keypad entry device 303; a processor, a programmable memory area; a control interface; a read only memory (ROM) containing an operating system; and an interface for interfacing with external computer 204 and external printer 205. When installed in rack 201, the reader-labelling device may be controlled and accessed externally from the external processor of computer 204 via the interface. The interface provides an external means of user input when the reader device is incorporated in a 5.25 inch device slot thus forming an integrated part of a larger system. This form of user input precludes the use of the optional casing mounted keypad 303 for inputting commands or the casing mounted display screen 302 for outputting status. The optionally provided display device 302 and keypad entry device 303 may be used for manual operation of the reader device, for inspection of a tape cartridge as an override to automatic reading and inspection of the tape cartridge information.

The processor of reader 200 has a relatively small amount of separate memory of the order of 1 MByte or less, and is limited practically by the smallest size of memory chip commercially available. Alternatively, the processor may be constructed integrally with memory area on a same chip, for example a known Power PC® chip. In the best mode, to achieve compact size and ease of manufacture, the components are as integrated as possible with the processor, and preferably include a built-in operating system in read only memory ROM, on a same chip as the processor.

An aerial and receiver are used to receive data from the memory device 101 of the cartridge 100 which uses an electrically erasable programmable read only memory (EEPROM) as read/write memory area. With the data storage cartridge 100 inserted in the reader device, 200 the aerial, of the memory device 101 forms a contactless interface with the aerial of the reader device using an inductive coupling scheme using a magnetic field to transmit data to the receiver of reader device 200. In the best mode, the protocol used to transmit information by the inductive coupling scheme is known as the MIFARE® system developed by Phillips/Mikron of the type presently employed in "Smart" credit card technology for use in personal banking applications and which is known in the art. Advantages and features of this system as used by the first embodiment include a high reliability, an operating frequency of 13.56 MHz, and an anti-collision protocol, which provides an ability to handle several trasponders in close proximity without interference.

The aerial of the reader and labeling device 200 is positioned such that when a tape cartridge 100 having an aerial is positioned in the cartridge receiving port 301 of the reader device 200, the two aerials are positioned a distance less than or equal to 20 mm from each other, so that inductive coupling can occur between the two aerials. Over such a range this yields coupling factors between aerials of the order 1 to 10% and transmission speeds of the order 100 Kbps between the aerials. The receiver of the reader and labeling device 200 transmits an inductive signal which is received by the transponder of the tape cartridge 100, and which powers the transponder associated with memory storage device 101 in the tape cartridge, such that the transponder is able to emit signals describing the content of the memory storage device 101 across an air gap between the two aerials, which is received by receiver. Alternatively, transmission of data signals between the memory device 101 and the reader-labeling device 200 may be within the infra-red range of frequencies.

Data read from the memory device 101 in this manner is written via the processor of reader and labeling device 200 to programmable random access memory of device 200, (RAM), where a copy of all read data is maintained. Data stored in the RAM is displayed on the display screen 302 or is accessed via the external processor of computer 204 using the control interface of device 200.

Writeable, erasable and re-writeable labels may be directly provided on the tape data storage cartridges 100 as supplied. Within casing 300, there is provided an internal printing device, which is configured for printing directly onto a label on a tape data storage cartridge, while the tape data storage cartridge 100 is located within the port 301.

Figure 4:
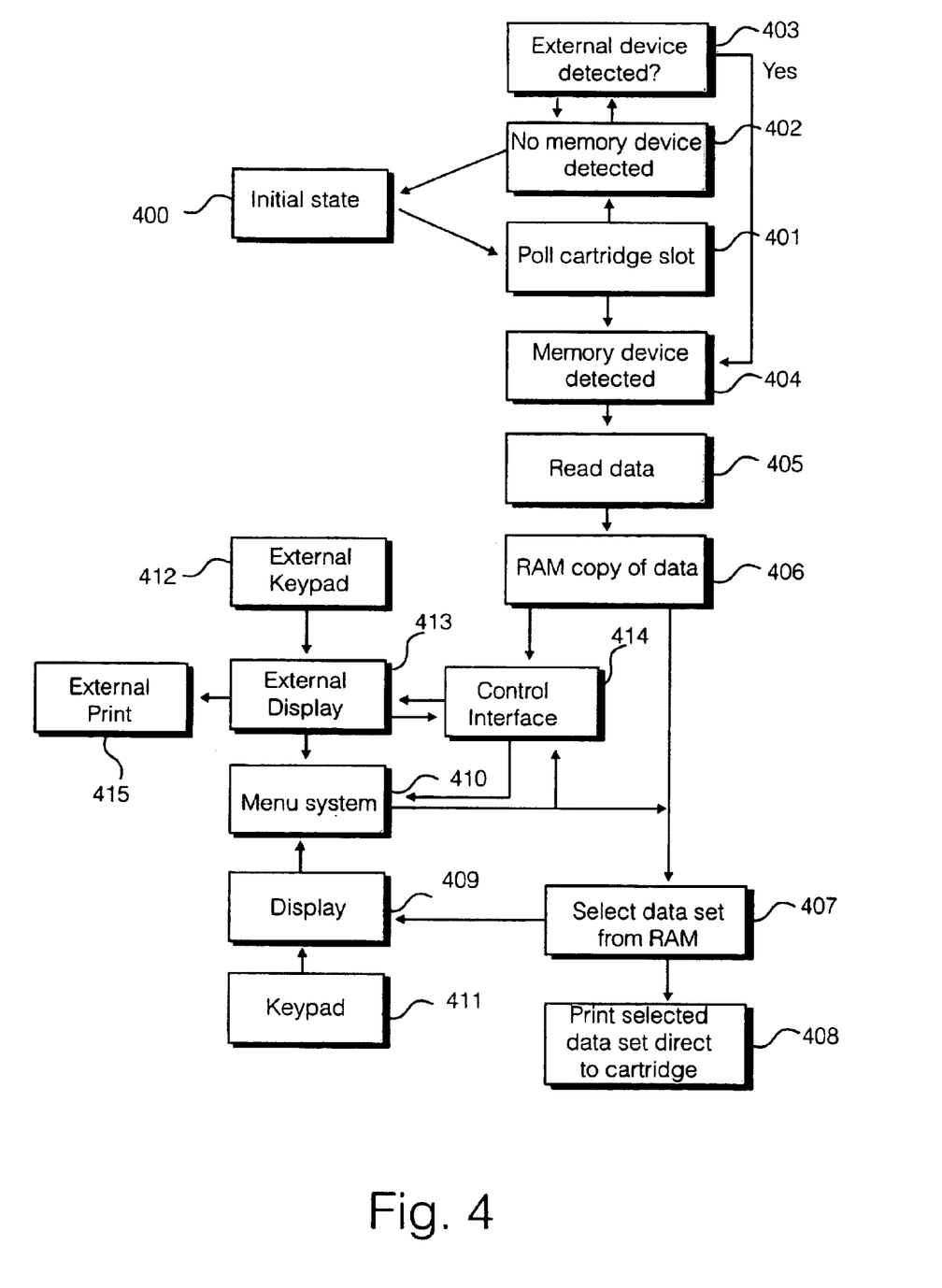
FIG. 4 is a flow diagram of a control process performed by the reader and labeling device of FIG. 3.
Figure 5A:
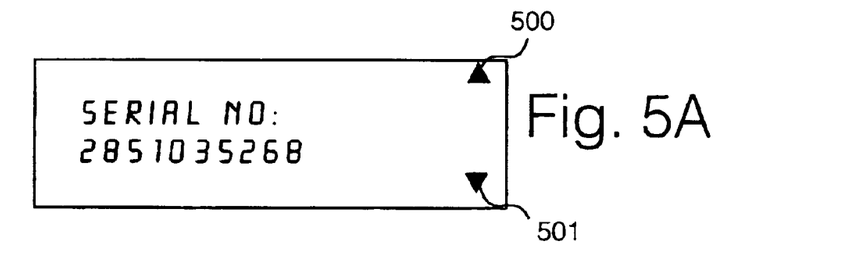
FIGS. 5A to 5G are illustrations of displays of predetermined selected data items read from the data storage cartridge of FIG. 1, and which appear on the display screen of the reader-printer device of FIG. 3.
Figure 5B:
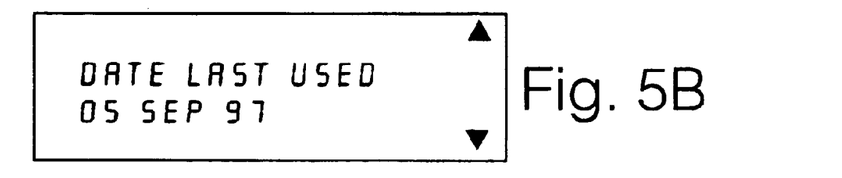
Figure 5C:
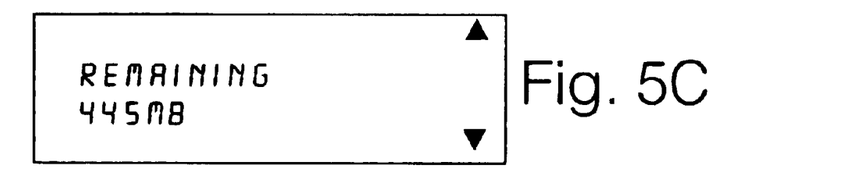
Figure 5D:
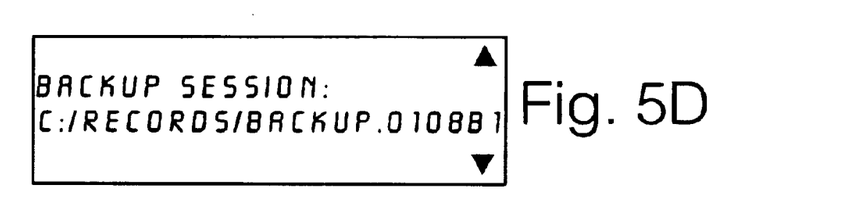
Figure 5E:
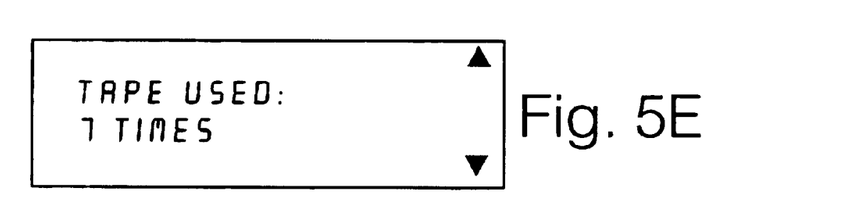
Figure 5F:
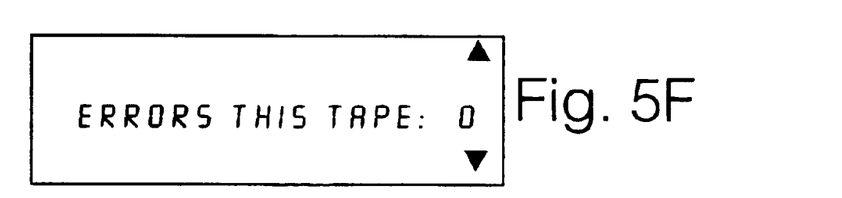
Figure 5G:
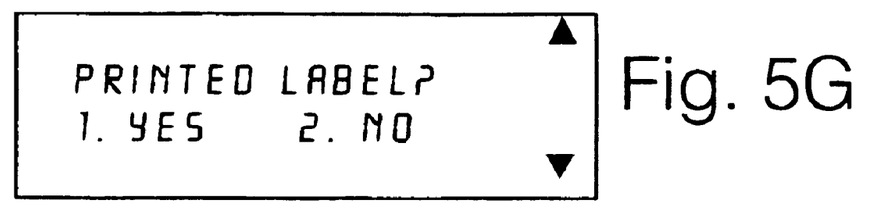

Referring to FIG. 4 herein, a first mode of operation of the reader-labeling device within the context of the automatic library system is now described. In use, the reader device 200 may be inaccessible to a user. The robotic arm 202 may be controlled by its own dedicated control systems to select and access a tape cartridge 100 from a receptacle of rack 201, as is conventionally known in the prior art. However, in the first mode of operation, the act of the robotic arm 202 placing a tape data storage cartridge 201 into the cartridge slot or port 301 of cartridge reader 200 activates a sensor internal to the cartridge receiving slot of the card reader which generates a signal to initiate a series of steps for printing label information directly to a writeable label portion of the tape data storage cartridge. The processor in reader 200 operates a series of control steps 400 to 406. A first mode of operation will now be described. The robot arm places a tape data cartridge 100 into the receiving port 301 of the reader and labeling device 200, thereby locating the cartridge firmly in the device in a position where the transponder memory device of the cartridge lies in close physical proximity to the aerial and receiver of the reader and labeling device. The processor under control of operating system stored in the ROM of device 200 operates in an initial state 400, from which the cartridge port is periodically polled in step 401. All transponders within the operating range return a 10 byte alpha-numeric serial number. If no memory device 100 is detected in the port 301 in step 402, the cartridge port is presumed empty, and the processor of device 200 idles through the initial state, and continues to poll the cartridge port in step 401. The cartridge slot 301 is presumed empty if no serial number is returned. Consequently an external detector device incorporated in the cartridge port 301 of the reader device 200 may be polled in step 403 to check whether a cartridge is inserted into the port. If no cartridge is detected, the processor of device 200 returns to initial state 400, continuously polling the cartridge slot in step 401 and/or polling the detector in step 403. If a memory 100 device is detected in slot 301 in steps 403 or 401, the processor of reader 200 enters a memory device detected state 404 from which the processor reads data received by the receiver via the aerial. The receiver continuously transmits power to the transponder in the tape cartridge in order to cause the transponder to transmit through the aerial signals containing data concerning the information stored on the read/write memory device 100. Transmission of the power across the air gap by the aerial may be dependent upon the sensor within the reader and labeling device casing being activated by insertion of a tape data storage cartridge.

In step 406, data read from the memory device 100 through the receiver is directed by the processor of device 200 into the random access memory of device 200. Data can be selected from the random access memory in step 407 for display on the display 302 of device 200 in step 409. Display of data from the RAM is accessed through operation of a menu system in step 410. Initially, predetermined data, for example a serial number of the cartridge which has been read from the memory device is displayed on the display device 302.

Referring to FIGS. 5 herein, there are shown displays which may occur on the display 302 of the reader labeling device 200 in the first mode of operation. Referring to FIG. 5A herein, there is illustrated schematically an example of information displayed on a display device 302, the information comprising a serial number of a tape cartridge. Upper and lower scroll icons 500, 501 may appear on the display, giving a visual indication to the operator that to access further items of data, the upper and lower scroll buttons of the keypad 303 need to be activated. In step 410 a user may enter keypad entries, for example pressing a scroll button which scrolls through display items as illustrated in FIGS. 5B to 5G herein under control of the operating system stored in the ROM of the reader labeling device 200, in the menu system. The operating system stored in the ROM is specifically configured from a knowledge of the format and layout of the information items stored as data in the memory device of the cartridge. By scrolling through the menu, by operating the keypad scroll buttons, display of the serial number of the tape, the date the tape was last used, an amount of memory remaining on the tape, names of back up sessions stored on the tape e.g. "Full Backup Monday Mar. 8, 1998", a number of times the tape has been used, a number of errors on the tape and an option to print a label containing a predetermined set of information items describing data stored on the tape may be accessed. If, in response to a 'print label' display as illustrated in FIG. 5G, a key on the keypad 303 is pressed, then in step 409, the processor sends a signal to the printer, along with signals describing the information to be printed on the label, which activates the printer to print a label. The label characteristics may be determined by user input via the menu system 409. Characteristics include a chosen language set, font size and type, and in this way allow the user to customise the label as necessary. In step 407, data is selected from random access memory, and is directly printed to a writeable medium on the tape data cartridge in step 408. Printing is direct to the cartridge and printing may be activated by a sensor triggered on insertion of the tape cartridge to the cartridge port.

In a second, automated mode of operation, an external computer device 204 comprising external processor external display, external keypad and data entry device, e.g. a pointing device or mouse, and an external printer 205 may be used to access the information stored on the memory device, externally of the automatic library. For example a PC, laptop or palmtop device connected to a device 205 may be used. In step 412, a user enters details on an external keypad, whilst viewing menu items displayed on the external display in step 413, which are transmitted from the reader-labeling device menu system via the interface through a series of control interface steps 414. By activating keys on the external keypad, the user may activate an external print operation 415 of external printer 205 to print a label for the cartridge. Alternatively, printing need not be activated, but a user may automatically view information contained on the tape cartridges via the external computer device, e.g. palmtop or laptop computer, which displays menu items on its screen.

Operation in the third mode is substantially similar as described herein above to the second mode, except when printing a label in step 415, the printer device within the casing 300 is activated externally via the interface in step 414, by viewing an external display 413 and activating keys in step 412 from an external keypad, such that the data to be printed on the label may be viewed externally by a user on the external computer device, and printing, once activated by a user externally of the reader device 200, takes place internally of the reader device 200 and directly onto the cartridge within the port 401.

Figure 6:
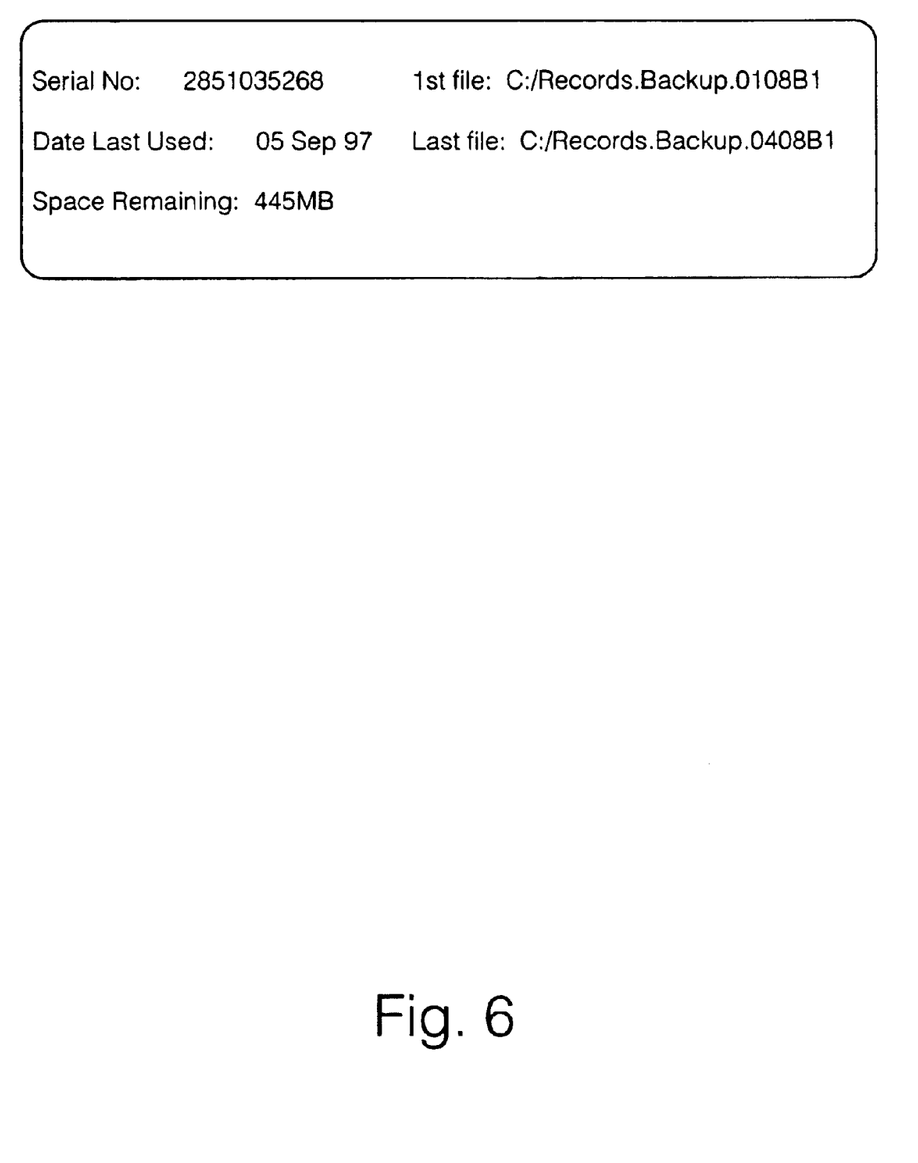
FIG. 6 is an illustration of an exemplary layout of a label printed by the read and labeling device of FIG. 3.

An example of a printed label is illustrated in FIG. 6 herein. The predetermined set of information items may be selected from the set: a serial number of the tape; a date the tape was last used; an amount of memory space remaining on the tape; a file name of a first file on the tape; a file name of the last file on the tape, a name of a back up session stored on the tape. This list of predetermined selected information items is exemplary, and not exhaustive, and the exact information items which are printed on the label depend upon the exact information items which are stored on the memory on the cartridge tape, which are specific to the particular media format of the tape cartridge and reader-labelling device, as will be understood by those skilled in the art.

Figure 7:
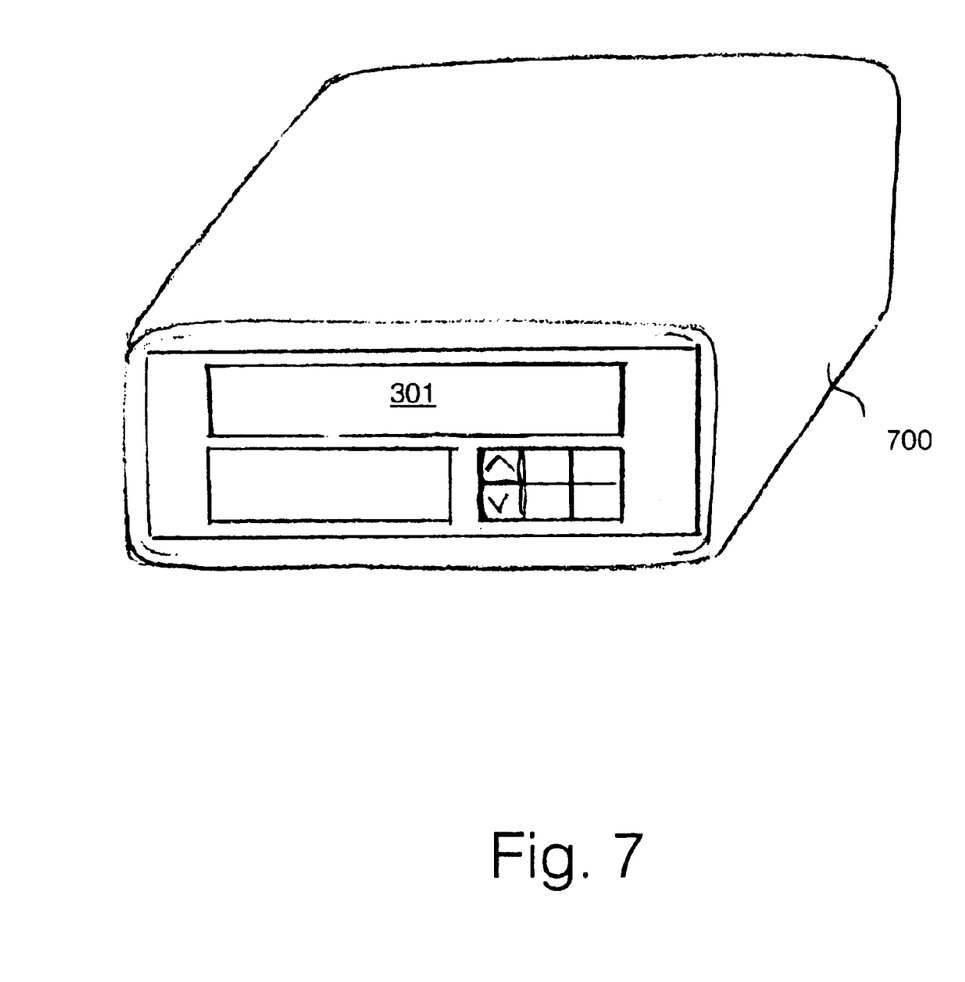
FIG. 7 is a perspective view of a second read and labeling device used in stand alone context in a casing having a power supply.

Referring to FIG. 7, in a variation of the second specific embodiment, the reader-labelling device may be adapted, such that it can be removed from a standard 5.25 inch port contained within the automatic library, and a custom made casing 700, e.g. a plastics moulding having an in-built power supply may be provided such that the reader-labelling device can be removed from the automated library, inserted into the casing 700, from which it obtains power, and be used as a stand alone reader-labeling device for printing labels from data storage cartridges which are manually inserted into port 301.

The power supply in-built to the casing may comprise a bay for containing a plurality of conventional dry cell batteries, giving for example a 12v power supply, enabling stand alone operation. Alternatively, the power supply may comprise a rechargeable battery in-built into the casing. In a further option, the power supply may comprise a transformer and voltage reducer built into the casing and connectable to an external mains supply by a conventional mains supply lead and connector. A conventional connector at the rear of the second embodiment reader-labeling device may connect with the power supply within the casing, on inserting the reader-labelling device into the casing in a sliding location operation.

Operation in stand alone mode is by user simply inserting a data storage cartridge directly into the reader-labelling device, which automatically reads data on the transponder device, and prints a pre-determined set of data onto a print media directly attached to the data storage cartridge. The print media may comprise a pre-manufactured area comprising part of a plastics cartridge case, suitable for direct printing thereon, or alternatively a user may manually stick an adhesive paper label onto the printer cartridge prior to inserting into the reader-labelling device, the printer printing directly to the label attached to the data cartridge.

What is claimed is:

1. An automatic library device for storing a plurality of cartridge data storage devices, each having a casing including a high capacity data storage medium, and having a programmable memory attached to said casing, said programmable memory being adapted to store data signals describing said data storage device, said library device comprising:

a plurality of receptacles for storing said plurality of said cartridge data storage devices;

an automatic selector operable to select, retrieve and replace said cartridge data storage devices from said receptacles; and a reader for transducing data vis a vis the high capacity medium of the cartridge devices, said selector being configured to selectively load one of the cartridges in said reader, said reader being configured to read the data signals from said programmable memory of the cartridge loaded in the reader and print indications derived from said data signals.

2. The library device as claimed in claim 1, wherein said reader comprises a port configured to accept said cartridge type data storage device, and a printer located in said port, said printer being configured to print the indications derived from the data signal directly to said data storage device when said data storage device is inserted in said port.

3. The library device as claimed in claim 1, wherein said reader comprises:

a receiver capable of receiving data signals from said programmable memory of said data storage device; and an interface for interfacing with a processor for communicating said data signals to an external processor device.

4. The library device as claimed in claim 1, wherein said reader device comprises:

an interface for interfacing with a processor for communicating said data signals to an external processor device, such that information included in data read from said programmable memory of said data storage device can be accessed by said external processor device via said interface.

5. The library device as claimed in claim 1, further comprising:

a read only memory storing an operating system for operating a processor to display said data items received from a receiver of the data items; and a display arranged to display said data items read from said programmable memory-via the receiver.

6. The library device as claimed in claim 1, further comprising a power source for supplying power to said data storage device, said power source being located in close proximity to said cartridge port for supplying power to said programmable memory.

7. The library device as claimed in claim 1, wherein the instrument includes a magnetic tape.

8. A method of labeling a data storage device carrying a large capacity memory medium and a small capacity programmable memory positioned on the exterior of a casing of the data storage device, the programmable memory storing data signals describing information about the data storage device, the method comprising the steps of:

placing said data storage device in a port of a reader capable of reading the data signals;

reading the data signals while the data storage device is in the port;

polling a detector of said read data signals;

receiving said data signals;

storing said data signals in a memory of said reader, and responding to the data signals stored in the memory of the reader by printing the information in such a way that the printed information can be put on said data storage device.

9. The method as claimed in claim 8, wherein said step of printing includes printing said predetermined set of data items on a label having a size and shape suitable for direct attachment to said data storage device, and thereafter applying said label to a cartridge of the data storage device.

10. The method as claimed in claim 8, wherein said step of printing comprises printing said predetermined set of data items directly onto a cartridge of said data storage device.

11. The method as claimed in claim 8, wherein the storage device includes a magnetic tape.

12. A method of obtaining information about a high-capacity data storage medium carried by a cartridge having a low capacity memory, the information being obtained without reading the high capacity data storage medium, the method comprising loading signals indicative of the information into the low capacity memory, subsequently loading the cartridge into a reader including a first transducer for the high capacity data storage medium and a second transducer for the low capacity memory, reading the signals indicative of the information stored in the low capacity memory by using the second transducer, and responding to the signals read by the second transducer indicative of the information stored in the low capacity memory by applying to the cartridge exterior human readable material commensurate with the information stored in the low capacity memory.

13. The method as claimed in claim 12, wherein the medium includes a magnetic tape.

* * * * *